United States Patent
Kugelmann et al.

(10) Patent No.: US 9,393,738 B2
(45) Date of Patent: Jul. 19, 2016

(54) DEVICE FOR LASER TRANSMISSION WELDING AND METHOD FOR LASER TRANSMISSION WELDING

(71) Applicant: Fresenius Medical Care Deutschland GmbH, Bad Homburg (DE)

(72) Inventors: Franz Kugelmann, St. Wendel/Bliesen (DE); Lars Moser, Dusseldorf (DE); Andreas Klemm, Oberlinxweiler (DE)

(73) Assignee: FRESENIUS MEDICAL CARE DEUTSCHLAND GMBH, Bad Homburg (DE)

( * ) Notice: Subject to any disclaimer, the term of this patent is extended or adjusted under 35 U.S.C. 154(b) by 135 days.

(21) Appl. No.: 14/072,863

(22) Filed: Nov. 6, 2013

(65) Prior Publication Data

US 2014/0127668 A1    May 8, 2014

Related U.S. Application Data

(60) Provisional application No. 61/722,912, filed on Nov. 6, 2012.

(30) Foreign Application Priority Data

Nov. 6, 2012 (DE) .......................... 10 2012 021 602

(51) Int. Cl.
*B29C 65/14* (2006.01)
*B29L 31/00* (2006.01)
(Continued)

(52) U.S. Cl.
CPC ......... *B29C 65/1412* (2013.01); *B29C 65/1635* (2013.01); *B29C 65/1677* (2013.01);
(Continued)

(58) Field of Classification Search
CPC ............ B29C 66/1122; B29C 66/8122; B29C 66/81267; B29C 66/8362; B29C 66/929; B29C 66/9241; B29C 65/1412; B29C 65/1635; B29C 65/1677
See application file for complete search history.

(56) References Cited

U.S. PATENT DOCUMENTS

| | | | |
|---|---|---|---|
| 2005/0039855 A1 | 2/2005 | Chen et al. | |
| 2005/0098260 A1* | 5/2005 | Chen | B23K 26/0604 |
| | | | 156/272.8 |
| 2009/0001054 A1* | 1/2009 | Mizuno | B23K 1/0056 |
| | | | 219/78.13 |

FOREIGN PATENT DOCUMENTS

| | | | |
|---|---|---|---|
| CN | 201151190 Y | 11/2008 | |
| CN | 101486255 B | 1/2012 | |
| DE | 4319742 A1 * | 12/1994 | ........... B23K 1/0056 |
| EP | 1508428 A1 | 2/2005 | |
| EP | 2607056 A1 | 6/2013 | |
| JP | 200581396 A | 3/2005 | |
| JP | 2009-184162 A | 8/2009 | |
| KR | 100936091 B1 | 6/2009 | |

OTHER PUBLICATIONS

English Translation Abstract of CN 201151190 published Nov. 19, 2008.

(Continued)

*Primary Examiner* — Daniel McNally
(74) *Attorney, Agent, or Firm* — The Dobrusin Law Firm, P.C.

(57) ABSTRACT

A device for the laser transmission welding of two plastic assembly parts is provided, wherein at least one of the plastic assembly parts contains an absorber for laser light, comprising a processing head with a processing side, with a processing-side discharge shaft for at least one laser beam and with a laser-transparent pressing means for pressing together the plastic assembly parts, wherein the laser-transparent pressing means is guided decoupled from the processing head in the discharge shaft. Furthermore, a method for producing a welded joint between two plastic assembly parts by laser transmission welding is specified.

16 Claims, 1 Drawing Sheet

(51) Int. Cl.
*B29C 65/16* (2006.01)
*B29C 65/00* (2006.01)

(52) U.S. Cl.
CPC ......... *B29C66/1122* (2013.01); *B29C 66/8122* (2013.01); *B29C 66/81267* (2013.01); *B29C 66/8362* (2013.01); *B29C 66/929* (2013.01); *B29C 66/9241* (2013.01); *B29C 65/1612* (2013.01); *B29C 65/1616* (2013.01); *B29C 65/1674* (2013.01); *B29C 65/1683* (2013.01); *B29C 66/00141* (2013.01); *B29C 66/53461* (2013.01); *B29C 66/71* (2013.01); *B29C 66/723* (2013.01); *B29C 66/73152* (2013.01); *B29C 66/73921* (2013.01); *B29C 66/8242* (2013.01); *B29C 66/8282* (2013.01); *B29C 66/83441* (2013.01); *B29K 2995/0027* (2013.01); *B29L 2031/753* (2013.01); *Y10T 403/477* (2015.01)

(56) References Cited

OTHER PUBLICATIONS

English Translation Abstract of JP 2005081396 published Mar. 31, 2005.

English Translation Abstract of DE 4319742 published Dec. 22, 1994.

English Translation Abstract of KR 100936091 published Jun. 11, 2009.

English Translation Abstract of CN 101486255 published Jul. 22, 2009.

English Translation Abstract of JP 2009-184162 published Aug. 20, 2009.

* cited by examiner

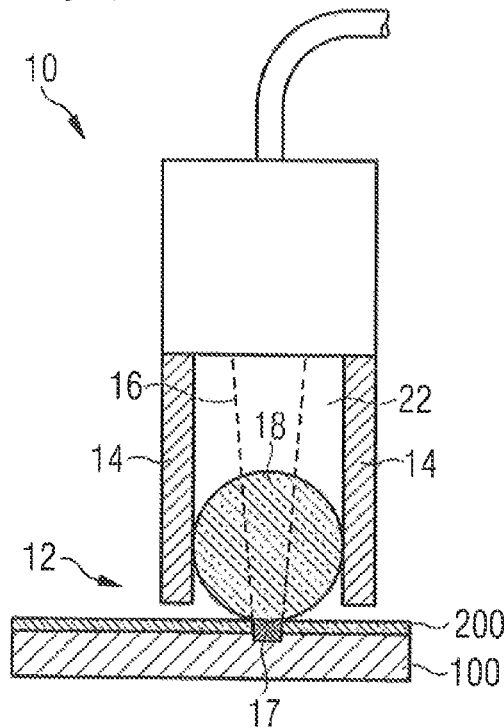
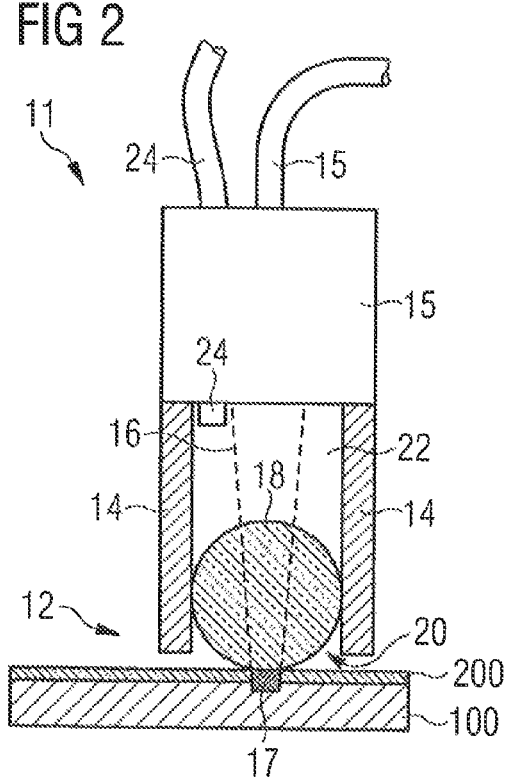

DEVICE FOR LASER TRANSMISSION WELDING AND METHOD FOR LASER TRANSMISSION WELDING

The present invention relates to a device for the laser transmission welding of two plastic assembly parts, a method for producing a welded joint between two plastic assembly parts by laser transmission welding, a composite that can be obtained by the method, as well as a use of the composite.

In principle, various possibilities exist for positively joining moulded parts made of plastics, in particular of different plastics. For example, two moulded parts can be joined together by adhesion by means of gluing or welding methods. An example of a welding method is laser transmission welding. The latter is suitable for example for welding films onto bending-resistant injection-moulded parts which are used as cassette modules for extracorporeal blood treatment.

The fundamental physical principle of a welding method by means of lasers requires that at least a portion of the applied laser light be absorbed by the material of at least one of the two moulded parts to be joined together, at least to the extent that it can be converted to heat and the material at the site heated by the laser light is melted by heating and thereby becomes flowable and makes possible a positive joint with the plastic material of the second moulded part.

A specific form of the laser welding method, namely the laser transmission welding method, has the advantage over other welding methods that even complex geometries of the joint surface can be welded quickly and efficiently. During the welding, for example, one join partner can be irradiated all the way through by the laser beam, i.e. the laser radiation is not absorbed. The second, or parts of the second, join partner should then be able to absorb the laser light, accompanied by the development of heat. The irradiation usually takes place from the outside of a join partner.

Parameters limiting the welding method are the wavelength of the laser light used and the absorption behaviour of the plastic at this wavelength. In particular, high-power diode lasers with a wavelength of 610-840 nanometers and Nd:YAG solid-state lasers with a wavelength of approximately 1050 nanometers are used either in the visible light range (400-750 nanometers) or in the infrared range. However, $CO_2$ gas lasers with a wavelength of approximately 11000 nanometers can also be used.

When a laser beam strikes a plastic part to be heated, the laser radiation is reflected, absorbed and transmitted. The decrease in intensity of the radiation penetrating the plastic can be described, depending on the material depth, according to the so-called Bouguer's law. The coupled-in intensity decreases exponentially with the material depth. The basic principles of laser welding methods are presented for example in H. Potente et al., "Laserschweißen von Thermoplasten" (Plastverarbeiter 1995, No. 9, p. 42 et seq.), F. Becker et al., "Trends bei Serien-schweißverfahren" in Kunststoffe 87 (1997, p. 11 et seq.) as well as by H. Puetz et al. in Modern Plastics, (1997, p. 121 et seq.).

The absorption behaviour and thus also the transmission of a polymer or plastic that is laser-transparent at a particular wavelength can be controlled e.g. by mixing in absorbers. Such absorbers are for example soot and also specific dyes which have been developed in recent years. A range of dyes which make such a controllable absorption behaviour possible are commercially available and have been specifically developed to be mixed into polymer mixtures in order to make a laser welding at defined wavelengths possible. The dyes disclosed in I. A. Jones et al. "Use of infrared dyes for Transmission Laser Welding of Plastics" (Tech 2000 Conference Proceedings, p. 1166 et seq.) also lend themselves to this.

In principle, there are several possibilities for introducing the above-named absorbers into the join partners to be welded, such as e.g. into a film and into a hard plastic part. As a first possibility, the absorber is added to the hard plastic part. During the welding, the laser beam is directed onto the arrangement of film and hard plastic part from the film side. The laser penetrates the film permeable for laser light and then strikes the hard plastic part. The hard plastic part contains the absorber and produces a welded joint with the film with the development of heat. A further possibility consists in applying the absorber as a functional coating between the hard plastic part and the film, such as e.g. with a printing method. Alternatively, the absorber can also be mixed into the film in order to generate the necessary welding temperature during the laser transmission welding.

The term "melting" of the material is understood in the present case not as thermodynamic melting in the sense of a phase transition, but as softening of the material and achieving a plastic processability under the welding conditions. The term "melting" can also include the thermodynamic melting of semicrystalline polymers in a film composite.

During the welding of plastics, not only does melting energy have to be introduced into the material, but a joining force also has to be applied to the assembly parts to be joined at the later weld seam. In laser welding, this can take place by laser-transparent pressure tools or by means of suitable clamping devices.

For the welding of films in the laser transmission method, the join partners are typically pressed against each other in order to bring about a corresponding flow of the polymer melt under the action of heat and thus the welding. During the laser transmission welding of flexible materials, such as e.g. plastic films, the problem arises that the join partners themselves do not have a sufficient rigidity and the contact pressure cannot be conducted onto the weld zone via the join partner itself. For laser transmission welding, therefore, films have to be covered by a pressure tool which produces the corresponding contact pressure at the weld zone. A direct laser radiation would not be possible if the pressure tools were not designed laser-transparent.

Laser-transparent pressure tools which are used for the laser welding of films are known. Glass sheets, mats, pressurizable cushions, compressed air, etc. can be used in order to exert a pressing force on the join partners from one direction and to produce radiation from the same direction with a laser which can optically penetrate the pressing mechanism.

In particular, this technology has been refined by the development of multilayered films which contain an absorber in an exposed layer. It is thereby possible to generate the required welding temperature, locally limited, directly at the weld zone of the two join partners by absorption of the laser light. The overall stability of the join partners is preserved because it is not necessary to melt all of the assembly part at the weld zone. The latter was the case with the $CO_2$ laser welding used until now. The absorption of the $CO_2$ laser energy takes place in this method by the plastic material itself and brings about a melting not only in the contact zone of the join partners. The use of absorber materials makes it possible to use a higher-energy laser light because the generation of the absorption energy is locally closely limited. Higher clock speeds can thereby be achieved in the production.

In the production of cassette modules which are used for extracorporeal blood treatment or peritoneal dialysis, films are welded onto a bending-resistant cassette body (e.g. WO 2010/121819, EP 0 956 876). The laser spot has to travel precise paths in a contour welding method in order to make possible the joint between cassette body and films in only pre-determined portions. For these welding methods, e.g. the already mentioned pressing via a silicone mat is chosen as pressing means. The associated welding method is described in WO 2010/015380. Alternatively, a pressing can also take place via compressed air.

However, the previously established welding methods each have disadvantages. The pressing via compressed air does not make it possible to build up a high contact pressure. The disadvantage is outweighed when set against a stronger melting of the join partners. However, the manufacturing times for producing the cassette modules are thereby extended, which is disadvantageous in production.

The pressing via the silicone mat results in the need to use a highly pure ambient environment and materials in order to achieve a sufficiently acceptable manufacturing time for the weld points. Embedded particles in the silicone mat or particles which are located on the surfaces of the join partners due to electrostatic adsorption develop, accompanied by absorption of the laser, such a high thermal energy that the join partners melt through. Accordingly, the laser energy has to be lowered in order to circumvent possible damage to the join partners, whereby the manufacturing times would become too long.

Furthermore, welding devices in which the laser light is conducted through a transparent glass ball onto the join partners are also known. The transparent glass ball is housed so that it can roll. The whole device is positioned on the join partners via the glass ball, with the result that the contact pressure is exerted directly onto the weld zone through the glass ball. The device can be moved/shifted by rolling on the glass ball, with the result that pre-determined contours can be travelled and welded. A disadvantage of the earlier system is that this device is relatively inert due to its high weight and is ill-suited to the welding of relatively light assembly parts, e.g. films and injection-moulded parts.

EP 1 405 713 describes a known device for welding by means of a rollably housed glass ball. The glass ball is housed in a shaft which is mechanically decoupled from the rest of the device by a spring. In this system, the decoupled part with the glass ball is too inert to be able to carry out a contour welding on a cassette module. Because of the inert construction, the glass ball cannot follow unevennesses on the join partners in the contour shape without making micro-jumps.

EP 1 440 784 describes a device with a transparent glass ball which is housed in a shaft part. A hot gas stream which is conducted past the sides of the glass ball pre-heats the assembly parts. As the glass ball is housed in a larger device, the device has a high inertia.

The high masses and inertias of the processing heads of known welding devices and the glass fibre coupling-in of the laser light used result in welding processes with relatively high contact pressure that cannot be adjusted as desired, a low dynamic and a slow response. There is therefore a need for a welding method for laser transmission welding with which a desired pressing force can be exerted on an assembly part to be welded, e.g. a film, and a defect-free welding can be achieved in a short manufacturing time.

The object of the invention is therefore to specify a device and a method with which a laser transmission welding of plastic assembly parts can be carried out precisely and in a short time.

In an embodiment, a device for the laser transmission welding of two plastic assembly parts is provided, wherein at least one of the plastic assembly parts contains an absorber for laser light, comprising a processing head with a processing side, a processing-side discharge shaft for at least one laser beam, and a laser-transparent pressing means for pressing together the plastic assembly parts; wherein the laser-transparent pressing means is guided decoupled from the processing head in the discharge shaft.

A further embodiment relates to a method for producing a welded joint between two plastic assembly parts by laser transmission welding, wherein at least one of the plastic assembly parts contains an absorber for laser light, comprising arranging the two plastic assembly parts one on top of the other; pressing together and irradiating the plastic assembly parts arranged one on top of the other with laser light using a device according to the above embodiment; wherein, in the processing head of the device, the laser-transparent pressing means is guided decoupled from the processing head in the discharge shaft.

According to another embodiment, a composite is specified, comprising two plastic assembly parts welded together, which can be obtained according to the method of the above embodiment.

In an embodiment, a composite according to the above embodiment is used for extracorporeal blood treatment or peritoneal dialysis.

The embodiments according to the invention make it possible for the pressing means not to be housed stationary in the discharge shaft, instead the pressing means is to be provided decoupled from the discharge shaft. The pressing means is merely enclosed by the discharge shaft. The pressing force necessary for welding the plastic assembly parts and the contact pressure necessary for this can therefore be kept low and fine regulated. In this way, small pressing forces can be generated which are suitable in particular for welding light, thin and/or very flexible assembly parts.

Further features and functionalities can be found in the following description of embodiments, the figures and the dependent claims.

In description of embodiments below, the terms "plastic assembly part" and "assembly part" are used synonymously.

As explained above, one embodiment relates to a device for the laser transmission welding of two plastic assembly parts, wherein at least one of the plastic assembly parts contains an absorber for laser light, comprising a processing head with a processing side, a processing-side discharge shaft for at least one laser beam and a laser-transparent pressing means for pressing together the plastic assembly parts, wherein the laser-transparent pressing means is guided decoupled from the processing head in the discharge shaft. The device can also be used for the laser transmission welding of at least two, i.e. more than two, plastic assembly parts.

The term "decoupled" comprises according to the invention that the pressing means is freely movable in the processing head and/or in the discharge shaft. Furthermore, the term "decoupled" comprises that the pressing means is provided in the processing head and/or in the discharge shaft without stationary housing. The pressing means can therefore be movable and/or displaceable in the processing head and/or in the discharge shaft, in particular in the direction towards and away from the processing side.

As the pressing means is provided decoupled from the processing head, the pressing force exerted by the pressing means can be finely adjusted and regulated. The pressing force necessary for welding the plastic assembly parts is realized by the pressing means' own weight. Furthermore, the influence of the rest of the processing head on the pressing force is kept small. In this way, small, very precise and/or constant pressing forces can be generated which are suitable in particular for welding light, thin and/or very flexible assembly parts, e.g. films. Therefore, a stick-slip effect, also called stick-slip phenomenon, i.e. the jerking of solid bodies moved against each other, can be avoided during the welding of the assembly parts. For example, an undesired wrinkle formation in a flexible film to be welded is avoided at the weld seam to be produced.

In addition, the mass of the pressing means of the device according to the invention essentially represents the unsprung mass of the processing head, with the result that only a small unsprung mass acts on the plastic assembly parts to be welded. Thus, a pressure reacting very finely to the smallest surface unevennesses can be realized. The device according to the invention is therefore suitable in particular for welding assembly parts with two- and/or three-dimensional contours. Moreover, the pressing means of the device according to the invention has only a small inert mass, with the result that the inertia of the processing head is small overall. A laser transmission welding with very high dynamic and high travel speeds, in particular also in the case of movements with turning points, can therefore be carried out with the device. Moreover, very short weld cycles can be realized with the device according to the invention.

In an embodiment, the pressing means can be moved in the direction towards and away from the processing side. The pressing means thus has a degree of freedom in the direction towards and away from the processing side. For example, the discharge shaft has a longitudinal axis in the direction of the processing side and the pressing means is movable and/or displaceable parallel to the longitudinal axis of the discharge shaft. This makes it possible for the pressing means to be guided in the discharge shaft axially movable and/or displaceable. A tolerance adjustment both with respect to the pressing force and with respect to a height variation of the point to be welded can thereby take place. The pressing means can also be movable and/or displaceable exclusively parallel to the longitudinal axis of the discharge shaft.

In an embodiment, the discharge shaft has an internal diameter, and the pressing means an external diameter which is smaller than the internal diameter of the discharge shaft. This makes it possible for the pressing means to be able to be moved inside the discharge shaft decoupled from the processing head.

The discharge shaft can have for example a cavity in and/or by which the pressing means is guided. The cavity can furthermore be formed cylindrical or tubular. Moreover, the cavity can extend over substantially the whole length of the discharge shaft. In these cases, the pressing means can be guided by the inner walls of the discharge shaft forming the cavity. The diameter of the cavity can represent the internal diameter of the discharge shaft.

In an embodiment, the discharge shaft can have a discharge opening for the laser beam, the discharge opening can have a diameter and the pressing means can have an external diameter which corresponds to the diameter of the discharge opening. If the pressing means moves into the discharge opening, the pressing means is held back in the discharge opening at the point of the external diameter which corresponds to the diameter of the discharge opening, e.g. by positive and/or force locking. It is thereby avoided that the pressing means completely leaves the discharge shaft. Furthermore, the pressing means and the discharge opening can consist of materials which can slide on each other. It is thus made possible that, after a force-locking hold of the pressing means, the latter can be released again from the discharge opening and moved into the discharge shaft. In an example, the pressing means can consist of glass and the borders of the discharge opening can comprise Teflon. In embodiments, the discharge shaft 14 can consist of a material suitable for dry-sliding bearings, for example it can comprise polytetrafluoroethylene, ultra-high-molecular polyethylene, polyoxymethylene or polyamide.

In embodiments, the pressing means can have a size and density on the basis of which the pressing means itself can exert the desired pressing force during the welding process.

Furthermore, the pressing means can be formed as a ball and/or be housed so that it can roll. Alternatively, the pressing means can also be designed as a rollably housed roll or as a cylinder with a processing-side hemispherical end.

In embodiments, the pressing means has a diameter in the range of from 15 to 50 mm, preferably 20 to 40 mm. The density of the pressing means can furthermore lie in the range of from 1.5 to 6 $kg/dm^3$, preferably 2 to 5 $kg/dm^3$, more preferably 3 to 4 $kg/dm^3$.

In an embodiment of the device, the processing head has a pressurized-fluid connection, directed into the discharge shaft towards the processing side, for a pressing fluid acting on the pressing means. The pressing force necessary for welding the plastic assembly parts can therefore be generated or intensified by a pressurized fluid acting on the pressing means, particular compressed air or a pressurized inert gas. The fine adjustment of the pressing force is thereby promoted.

The processing head and/or the discharge shaft can furthermore have optical apparatuses for introducing, guiding, focusing and/or shaping the laser beam. Optical apparatuses can be provided for this in the processing head and/or the discharge shaft. For example, the laser beam is introduced by means of a glass fibre into the discharge shaft. Mirrors can be used to guide the laser beam. Furthermore, lenses can be provided for focusing and/or shaping the laser beam.

A further embodiment specifies a method for producing a welded joint between two plastic assembly parts by laser transmission welding, wherein at least one of the plastic assembly parts contains an absorber for laser light. The method comprises arranging the two plastic assembly parts one on top of the other, pressing together and irradiating the plastic assembly parts arranged one on top of the other with laser light using a device according to one of the embodiments described here, wherein in the processing head of the device the laser-transparent pressing means is guided decoupled from the processing head in the discharge shaft. The pressing-together and/or the irradiation with laser light of the plastic assembly parts arranged one on top of the other can take place locally. The method can also be used for the laser transmission welding of at least two, i.e. more than two, plastic assembly parts.

For example, a film, which contains an absorber, and a hard plastic part are placed one on top of the other on a working surface. The pressing means of the processing head of the device according to the invention is positioned on the points to be joined of the assembly parts thus brought into contact. The film adapts to the contours and surface unevennesses of the hard plastic part due to the pressing force generated by means of the pressing means and is pressed against the contours and surface unevennesses of the hard plastic part. As the pressing force of the processing head is small according to the invention and is finely regulated, a high-quality smooth weld seam can be produced under the action of the laser light. Because in addition only a small inert mass acts on the weld point, the laser transmission welding can be carried out with a high dynamic and a fast response.

In the method of embodiments, the pressing force and/or the associated contact pressure can be generated by the pressing means' own weight on the plastic assembly parts. In addition, the pressing means can be acted on by a pressing pressurized fluid directed towards the processing side, in particular by compressed air, in order to generate or intensify the pressing force.

For example, in the method of embodiments, a pressing force in the range of from 0.01 N to 1000 N, preferably 1 to 50 N, is exerted on the plastic assembly parts. Furthermore, the pressing means can be acted on at a contact pressure in the range of from 0 to 7 bar, preferably 0.1 to 70 mbar. For example, the pressing force due to the pressing means' own weight is up to roughly 4 N. Furthermore, when the pressing means is acted on at a contact pressure of roughly 5 bar, a pressing force of up to roughly 1000 N can be exerted on the pressing means.

In the method of embodiments, the pressing means is moved in the direction towards and away from the processing side of the processing head. For example, the discharge shaft has a longitudinal axis in the direction of the processing side and the pressing means is moved and/or displaced parallel to the longitudinal axis of the discharge shaft.

The pressing means can also be moved and/or displaced exclusively parallel to the longitudinal axis of the discharge shaft. Thus, the pressing means can be guided axially movable and/or displaceable in the discharge shaft. A tolerance adjustment both with respect to the pressing force and with respect to a height variation of the point to be welded can thereby take place.

As explained above, in the device used in the method of embodiments, the discharge shaft can furthermore have a cavity, preferably a cylindrical cavity, in and/or by which the pressing means is guided. Furthermore, a ball can be used as the pressing means. The method is preferably carried out under protective gas in order to avoid the occurrence of a burn hole during the laser welding.

In the method of embodiments, the plastic assembly parts comprise a multilayer film, which has a join layer, and a hard plastic part, and the join layer contains the absorber for laser light. By using the absorber-containing join layer, the welding heat is essentially generated only in the join layer and in the area of the surface of the hard plastic part bordering the join layer. The multilayer film thereby maintains its dimensional stability, as only part of the multilayer film is melted by the laser light absorption of the absorber. In this way, a thinning-out of the film or a fraying of the weld seam is avoided.

In the method of embodiments, a hard part made of a plastic, preferably made of an injection-mouldable plastic, selected from the group consisting of polyethylene, polypropylene, polyisoprene and blends and copolymers thereof, PET as well as polycarbonates, can be used as the hard plastic part. Furthermore, a layer made of a material selected from the group consisting of polypropylene, polyethylene, polyisoprene, olefinic styrene block copolymers, blends and copolymers thereof, can be used as the join layer of the multilayer film. In examples of the method, a multilayer film with a join layer having a thickness of from 10 to 100 μm can be used.

In a preferred embodiment, which can be used in particular in medical technology, the join layer has a thickness of 10-100 μm predominantly consisting of 95-100% of a polypropylene, not including the absorber. For the formulation of the join layer, however, different polymer blends are possible depending on the welding arrangement. Non-limiting examples are polymers or copolymers of C2-C10 monomers such as polyethylene, polypropylene, polyisoprene, and butadiene, olefinic styrene block copolymers with block copolymers of styrene, etc., such as e.g. SIS, SEBS, SEPS. These examples are commercially available e.g. under the trade names KRATON® G 1652, KRATON® G 1657, KRATON® G 1726, KRATON®FG 1901 and KRATON®FG 1924 or Hybrar®, Tuftec® and Septon®.

In embodiments, an IR absorber which absorbs IR radiation, in particular in the range of 770-1500 nm, can be used as the absorber for laser light. Furthermore, the absorber for laser light can be used in a quantity of from 50 to 700 ppm, relative to the weight of the join layer. In addition, laser light of an Nd:YAG laser and/or laser light in the IR range, in particular in the range of 770-1500 nm, is used for example.

A further embodiment relates to a composite, comprising two plastic assembly parts welded together, wherein the composite can be obtained using the method according to one of the embodiments described here. The composite can be used in particular for extracorporeal blood treatment or peritoneal dialysis.

All of the features of embodiments described here and not mutually exclusive can be combined with each other. Elements of an embodiment can be used in the other embodiments without further mention. Identical elements of embodiments are provided with the same reference numbers in the following description. Embodiments of the invention will now be described in more detail using the following examples with reference to figures, without wishing thereby to limit them. There are shown in:

BRIEF DESCRIPTION OF THE DRAWINGS

FIG. 1 a schematically represented welding arrangement of a first example; and

FIG. 2 a schematically represented welding arrangement of a second example.

Examples of the invention are described below with reference to the welding of a multilayer film, which contains a join layer, to a bending-resistant cassette body, without limiting the invention to this.

The example represented schematically in FIG. 1 of a welding arrangement comprises a hard plastic part 100, a multilayer film 200 arranged on the hard plastic part 100 and a processing head 10 of a device according to the invention for laser transmission welding. The multilayer film 200 and the hard plastic part 100 are placed one on top of the other on a working surface (not shown) in the present example.

The processing head 10 has a processing side 12 which is directed in FIG. 1 onto the multilayer film 200 arranged over the hard plastic part 100. The processing side 12 is formed by the free end of a hollow cylinder-shaped discharge shaft 14. The discharge shaft 14 is formed from polytetrafluoroethylene (PTFE) in the present example. In the discharge shaft 14, a ball 18 which is guided by the inner walls of the discharge shaft 14 is arranged as a laser-transparent pressing means. The ball is made of glass having a density of 2.5 kg/dm³ and has a diameter of 30 mm and a weight of 35 g. The ball 18 consists of glass N-BK7 in the present example. A cavity 22 formed by the walls of the discharge shaft has a length which is greater than the diameter of the ball 18, a central longitudinal axis and has an internal diameter of 30.05 mm along its whole length.

FIG. 2 schematically shows a second example of a welding arrangement, in which a device according to the invention is used for laser transmission welding. In the second example, a processing head 11 is used which has the elements of the processing head 10 and additionally has a pressurized-fluid connection 24, directed into the discharge shaft towards the processing side, for a pressing fluid acting on the pressing means. Compressed air can be used as pressurized fluid.

The processing head 10, like the processing head 11, can additionally be provided with apparatuses 15 for introducing, guiding, focusing and/or shaping the laser beam, such as a glass fibre, mirrors or lenses, which is represented schematically in FIG. 2.

Any weldable thermoplastic which is sufficiently thermodynamically compatible for welding to a corresponding piece of film can be used as plastic for the hard plastic part 100. In the present example, the hard plastic part 100 consists of injection-mouldable polypropylene (PP).

The multilayer film 200 is flexible and composed of three layers (not shown), wherein in the present example the inner layer is the join layer. The multilayer film 200 has the following layer structure and composition:

| Outer layer | 30 μm | 100% PP copolymer with ethylene portion |
|---|---|---|
| Middle layer | 200 μm | 50% SEBS (styrene-ethylene-butadiene-styrene) |
| | | 50% PP copolymer with ethylene portion |
| Inner layer | 20 μm | 60 parts by weight PP copolymer with ethylene portion |
| | 80 μm | 80 parts by weight SEBS |
| | | 500 ppm absorber BASF Lumogen IR 788 |

The join layer (inner layer) rests on the hard plastic part 100 in the composite welding arrangement shown in FIG. 1. The formulation of the join layer is matched to the material of the hard part in terms of weldability. The join layer typically has a smaller layer thickness than the support layer in order to allow the temperature development to occur, as far as possible, only in the vicinity of the weld zone.

The join layer contains an absorber for laser light which absorbs the laser light radiated into the multilayer film 200 and thereby results in the heating of the join layer and the adjacent areas of the hard plastic part 100 and the multilayer film 200. In the present example, Lumogen IR 788 from BASF in a quantity of 500 ppm, relative to the join layer, is used as absorber. Lumogen IR 788 from BASF has a maximum absorption at 788 nm.

The laser light used is generated by a diode laser (not shown) and has a maximum wavelength at in particular 808 nm. For this, a neodymium-doped yttrium-aluminium-garnet laser (Nd:YAG laser) is used. In the present example, a diode laser Laserline LDF 1000-500 from Laserline GmbH is used.

In operation, the processing head 10 or 11 is positioned on the point to be joined such that the discharge shaft 14 is spaced apart from the multilayer film, the ball 18 protrudes from the discharge opening 20 and rests on the multilayer film 200 with its own weight. Thus, a pressing force of roughly 0.35 N is generated onto the multilayer film 200. The processing head 10 or 11 is then guided over the multilayer film and the ball 18 rolled on the multilayer film 200. The ball 18 is moved and guided in the discharge shaft 14 decoupled from the processing head 10. The ball 18 forms the essentially single unsprung mass in the processing head. As the ball 18 is movable inside the discharge shaft 14 parallel to the longitudinal axis of the cavity, a tolerance adjustment both with respect to the pressing force and with respect to a height variation of the point to be welded can take place. The film 200 adapts to the contours and surface unevennesses of the hard plastic part 100 due to the pressing and is pressed against the contours and surface unevennesses of the hard plastic part.

During use of the processing head 11 of FIG. 2, the ball 18 is additionally acted on with compressed air of approximately 30 mbar, whereby the pressing force on the multilayer film is intensified. A pressing force of roughly 2.5 N is thereby exerted on the plastic assembly parts.

While the processing head 10 or 11 is being guided over the multilayer film 200, a laser beam 16 is directed onto the laser-transparent ball 18 and through this onto the point to be joined. As schematically represented in FIGS. 1 and 2, the laser light thus radiated onto the plastic assembly parts produces a weld seam 17 in which the plastics of the join layer of the multilayer film 200 and of the hard plastic part 100 are melted locally. Once the weld zone has cooled, the multilayer film 200 and the hard plastic part 100 are welded smoothly, i.e. without wrinkle formation in the film, and securely to each other via the weld seam 17. As the pressing force of the processing head is small and can be finely regulated via the ball 18 and/or the compressed air, the weld seam 17 is produced to a high quality under the action of the laser light. Because in addition only a small inert mass acts on the weld point, the laser transmission welding can be carried out with a high dynamic, a high travel speed and a fast response.

The invention claimed is:

1. A device for laser transmission welding of two plastic assembly parts, wherein at least one of the plastic assembly parts contains an absorber for laser light, the device comprising:
   a processing head including:
      a processing side;
      a processing-side discharge shaft for at least one laser beam; and
      a laser-transparent pressing means for pressing together the plastic assembly parts;
   wherein the laser-transparent pressing means is guided decoupled from the processing head in the discharge shaft
   wherein the pressing means is movable in a direction towards and away from the processing side,
   wherein the discharge shaft has a cylindrical cavity in and by which the pressing means is guided,
   wherein the discharge shaft has an internal diameter, and the pressing means has an external diameter that is smaller than the internal diameter of the discharge shaft,
   wherein the discharge shaft has a discharge opening for the at least one laser beam, the discharge opening has a diameter that corresponds to the external diameter of the pressing means,
   wherein the external diameter of the pressing means has a range of about 15 mm to about 50 mm, and
   wherein the pressing means has a density in a range of about 1.5 kg/dm$^3$ to about 6 kg/dm$^3$.

2. The device according to claim 1, wherein the pressing means is formed as a ball.

3. The device according to claim 1, wherein the pressing means and the discharge opening consist of materials which can slide on each other.

4. The device according to claim 1, wherein the processing head has a pressurized-fluid connection directed into the discharge shaft towards the processing side for a pressing fluid acting on the pressing means; and/or
   wherein the processing head and/or the discharge shaft have optical apparatuses for introducing, guiding, focusing and/or shaping the at least one laser beam.

5. A method for producing a welded joint between the two plastic assembly parts by laser transmission welding, wherein at least one of the plastic assembly parts contains the absorber for laser light, comprising:
   arranging the two plastic assembly parts one on top of the other;
   pressing together and irradiating the plastic assembly parts arranged one on top of the other with laser light using the device according to claim 1;

wherein in the processing head of the device the laser-transparent pressing means is guided decoupled from the processing head in the discharge shaft.

6. The method according to claim 5, wherein the plastic assembly parts comprise a multilayer film that has a join layer and a hard plastic part, and the join layer contains the absorber for laser light.

7. The method according to claim 6, wherein a hard part made of a plastic, preferably made of an injection-mouldable plastic, selected from the group consisting of polyethylene, polypropylene, polyisoprene and blends and copolymers thereof, PET as well as polycarbonates, is used as the hard plastic part; and/or
   wherein a layer made of a material selected from the group consisting of polypropylene, polyethylene, polyisoprene, olefinic styrene block copolymers, blends and copolymers thereof, is used as the join layer of the multilayer film; and/or
   wherein a layer having a thickness of from 10 to 100 llm is used as the join layer.

8. The method according to claim 5, wherein a pressing force is exerted on the plastic assembly parts by the pressing means' own weight.

9. The method according to claim 5, wherein the pressing means is acted on in the discharge shaft with a pressing pressurized fluid, in particular with compressed air, directed towards the processing side.

10. The method according to claim 5, wherein a pressing force in the range of from 0.01 N to 1000 N is exerted on the plastic assembly parts; and/or
   wherein the pressing means is acted on with a contact pressure in the range of from 0 to 7 bar.

11. The method according to claim 5, wherein the pressing means is moved in the direction towards and away from the processing side; and/or
   wherein the discharge shaft has a longitudinal axis and the pressing means is moved parallel to the longitudinal axis of the discharge shaft; and/or
   wherein the discharge shaft has a cavity, preferably a cylindrical cavity, in and/or by which the pressing means is guided; and/or
   wherein a ball is used as the pressing means; and/or
   wherein the method is carried out under protective gas.

12. The method according to claim 5, wherein an IR absorber which absorbs IR radiation, in particular in the range of 770-1500 nm, is used as the absorber for laser light; and/or
   wherein the absorber for laser light is used in a quantity of from 50 to 700 ppm, relative to the weight of a join layer; and/or
   wherein laser light of an Nd:YAG laser and/or laser light in the IR range, in particular in the range of 770-1500 nm, is used.

13. A device comprising:
   a processing head comprising a discharge shaft defining a cylindrically-shaped cavity, the discharge shaft defining a discharge opening for a laser beam;
   a pressing means comprising a ball positioned within the cavity, the ball being displaceable within the cavity and along a longitudinal axis of the cavity, the ball is configured to exert a pressing force on two or more plastic parts, the pressing means has a diameter between about 20 mm to about 40 mm and a density of about 3 kg/dm$^3$ to about 4 kg/dm$^3$; and
   a pressurized-fluid connection directed into the cavity and supplying a pressing fluid on the pressing means so that the pressing force exerted by the pressing means on the two or more plastic parts is intensified,
   wherein the device is provided for laser transmission welding of the two or more plastic parts, and
   wherein at least one of the two plastic parts contains an absorber for laser light.

14. The device of claim 13, wherein the pressing force is realized by a weight of the ball.

15. The device of claim 13, wherein the pressing force has a range of 0.01 N to 1000 N, and
   wherein the pressing means is acted on with a contact pressure in the range of from 0 to 7 bar.

16. The device of claim 13, wherein the device is provided with apparatuses for introducing, guiding, focusing and/or shaping the laser beam.

* * * * *